Figure 1:
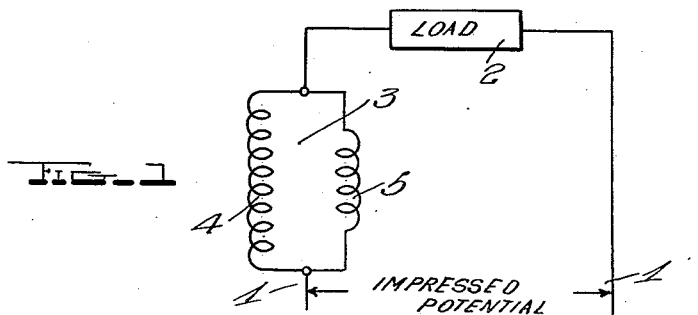

Sept. 4, 1934.  A. B. RYPINSKI  1,972,112
SLOW REACTOR OR CIRCUIT CONTROLLER
Filed April 28, 1932  2 Sheets-Sheet 2
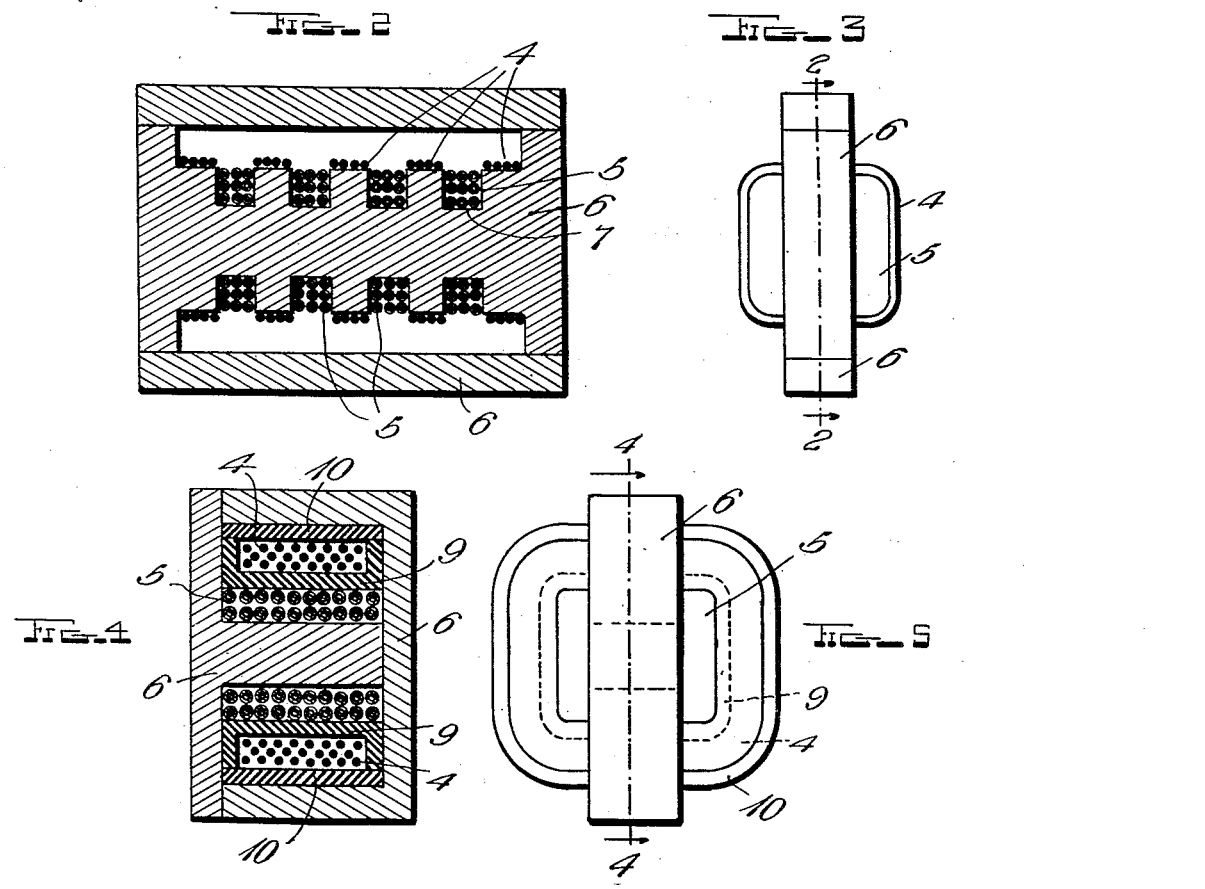
INVENTOR.
Albert B. Rypinski,
BY John C Brody
ATTORNEY Patented Sept. 4, 1934

1,972,112

UNITED STATES PATENT OFFICE 1,972,112

SLOW REACTOR OR CIRCUIT CONTROLLER

Albert B. Rypinski, Laurelton, Long Island, N. Y.

Application April 28, 1932, Serial No. 608,095

23 Claims. (Cl. 171—242)

My invention relates broadly to a slow reactor or circuit controller for many diverse uses, particularly as an impedance device for controlling the operation of a load with reference to the lapse of a predetermined time period.

This application is a continuation in part of my application Serial No. 416,877, filed December 29, 1929, entitled "Slow electromagnet".

One of the objects of my invention is to provide an arrangement of impedance device which may be electrically connected in circuit with a load for controlling the operation of the load according to the lapse of a predetermined time interval.

Another object of my invention is to provide a circuit arrangement for and a construction of inductive device having means for varying the inductive voltage drop in the circuit in which the device is connected in accordance with the lapse of a predetermined time interval.

Still another object of my invention is to provide a construction of circuit controller arranged to be electrically connected between a load and a source of power supply including a pair of electromagnetic windings connected in parallel and arranged in magnetically opposed relation and producing by such opposition a difference in the effective ampere turns thereof after a predetermined time interval for correspondingly controlling the current through the load.

A further object of my invention is to provide a construction of inductive device consisting of a pair of parallel electromagnetically opposed windings electrically connected between a source of power supply and a load, and wherein the windings are thermally related and are arranged for operation at substantially unity power factor when cool and less than unity power factor when heated after the lapse of a predetermined time period.

A still further object of my invention is to provide a construction of inductive device having a pair of paralleled and opposed magnetic windings thermally related one to another and having the relative ampere turns of the windings varying according to temperature for varying the voltage drop across the windings and correspondingly varying the voltage across the load to which the windings connect from the source of power supply.

Another object of my invention is to provide a circuit arrangement for and construction of inductance device which, by the selection of the characteristics of the inductance device enable the current to a load circuit to be increased or decreased after the lapse of a predetermined time period, subsequent to the application of potential to the device.

Figure 6:
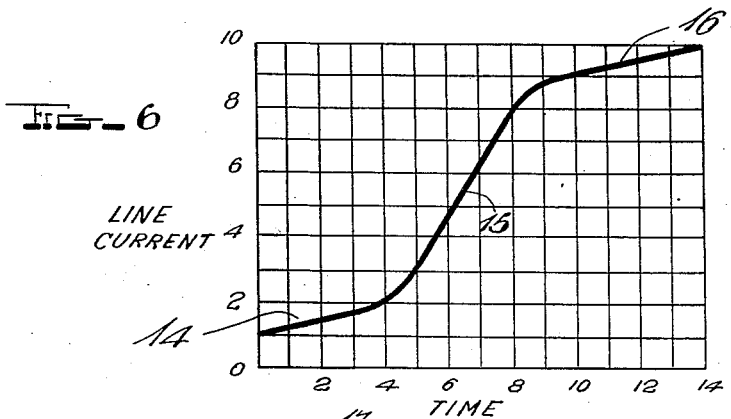
Figure 7:
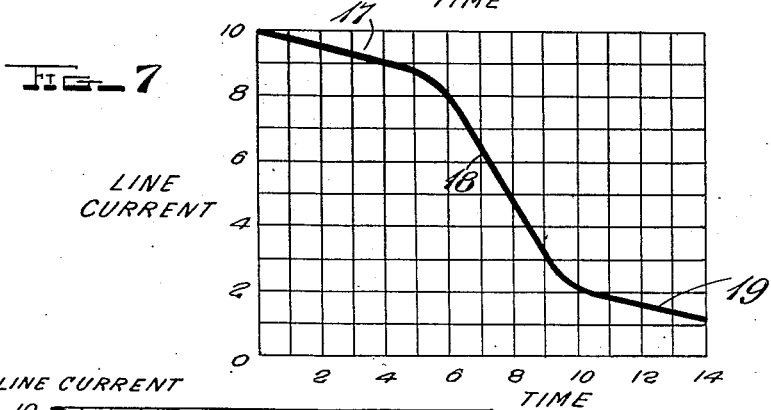
Figure 8:
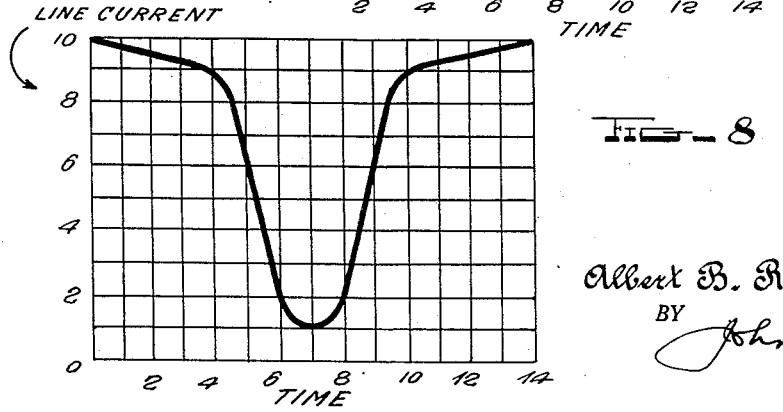

Other and further objects of my invention reside in the method of controlling the supply of power to a load as set forth more fully in the specification hereinafter following by reference to the accompanying drawings, wherein:

Figure 1 diagrammatically shows the principle involved in the circuit controller of my invention; Fig. 2 is a vertical cross-sectional view showing the arrangement of core structure and windings which may be employed in the circuit controller of my invention, the view being taken on line 2—2 of Fig. 3; Fig. 3 is an end view of the core structure and winding inductively arranged thereon as illustrated in Fig. 2; Fig. 4 is a vertical cross-sectional view through a core structure and multiplicity of windings arranged thereon taken on line 4—4 of Fig. 5 in a manner modified from the arrangement illustrated in Figs. 2 and 3; Fig. 5 is an end view of the core structure showing the windings illustrated in Fig. 4; Fig. 6 is a curve showing the characteristic of a control device embodying my invention where the current rises after the lapse of a given time interval subsequent to initial application; Fig. 7 is a curve showing the characteristics of a control device of my invention wherein the current decreases after a given time interval subsequent to the application of the current; and Fig. 8 is a curve illustrating the effects of line current where the coil of my invention is initially balanced, becomes unbalanced when partly heated and then balances again when hot.

My invention is directed to a slow reactor or circuit controller which comprises an impedance device formed by a pair of inductively related windings connected in magnetic opposition. In my copending application Serial No. 416,877, I disclose and claim a slow reactor or circuit controller having two inductively coupled and opposed windings connected in parallel, the materials in the windings having substantially different temperature coefficients of resistance. The invention embraced in this continuation in part application is directed to a slow reactor or circuit controller having two inductively coupled or opposed windings connected in parallel, the materials in the windings having substantially equal positive or negative temperature coefficients of resistance. A disproportionate change in resistance of the two windings in this application is brought about by causing the temperature of one winding to change more than the temperature of the other winding. A number of means may be employed singly or in combination to affect the thermal action of the two windings. The amount of thermal relation may be controlled by the manner in which the windings are associated with more or less heat insulation therebetween. The two inductances which are magnetically coupled in opposition and connected in parallel one with the other may be disposed in series between a source of potential and a load. In the several forms of my invention one inductance may have a larger number of turns than the other or the kind and size of wire may differ or the heat to be dissipated from one winding may be less per unit area of radiating surface than the other, or the total heat produced in one may be very small as compared with the total heat in the other, or the heat dissipating means for one winding may have greater heat conductivity than the other, or there may be auxiliary means to cool or heat one of the two windings. The rate at which one winding changes in temperature is therefore different from the rate at which the other winding changes in temperature and the windings will be subjected to different temperatures which mutually act upon the windings for bringing said windings to a selected temperature at which the windings have a corresponding resistance. The effective ampere turns of the windings in parallel will therefore be different after a predetermined time interval subsequent to the application of potential to the circuit in which the windings and the load are connected. The magnetic opposition of the two windings subjects the windings to a condition in which the relative ampere turns of the windings vary according to temperature for varying the voltage drop across the windings and correspondingly varying the voltage across the load.

The appliance of my invention may normally produce substantially unity power factor and may become effectively inductive only under abnormal or temporary conditions due to unbalance brought about by the magnetic field of one winding opposing the magnetic field of the other winding, producing changes in temperature and a difference in the effective ampere turns of the windings after a predetermined time interval for correspondingly controlling the current through the load. When heated, the appliance may have substantially less than unity power factor. In a coil designed for a maximum interlinkage of the opposing magnetic fields produced by the opposed windings, at one set of temperatures there will be practically zero magnetism produced, and the coil as a whole will operate at substantially unity power factor. There will be no hysteresis or eddy current loss, the voltage drop through the coil will be only that due to resistance or IR, and the losses will only be those due to resistance, or $I^2R$. After the lapse of a predetermined time interval the power factor drops from substantially unity to less than unity. The inductive drop across the windings is substantially zero at one range of current values and is relatively large over another range of current values. As the temperature changes the resistance of the windings changes and alters the dimension of current between the windings and the effective ampere turns and thus alters the magnetic field. The action of the magnetic fields is such as to vary the induced voltages in the windings, and therefore the inductive voltage drop through them. The inductive voltage drop is varied in accordance with the lapse of a predetermined time interval as a result of which the load may be initially subjected to one value of current and after the lapse of a given time interval subjected to a different value of load. The effective magnetism may be made to increase or decrease in the core as the ratio of the ampere turns of the windings is caused to vary according to temperature.

The impedance device of my invention may taken many forms and the structures illustrated in the drawings are to be considered in the illustrative sense and not as in any manner limiting my invention.

In the foregoing the expressions "equivalent materials", "high coefficient material" and in certain of the claims which follow, the expression "said windings having the same or approximately equal temperature coefficients of resistance" are used. In order that an exact meaning may be assigned to these expressions, I append herein a table of temperature coefficients of resistance as given on pages 323, 324 and 325 of the Smithsonian Physical Tables for 1929:

| Material | Temp. | Temp. coeff. of res. | Material | Temp. | Temp. coeff. of res. |
|---|---|---|---|---|---|
| Iala | | | Aluminum | 25° C. | .0034 |
| Advance | | | Antimony | 20° C. | .0036 |
| Constantan | 25° C. | .000002 | Bismuth | 20° C. | .004 |
| Calido | | | Cadmium | 20° C. | .0038 |
| Ideal | | | Calcium | | .0036 |
| | | | Copper | 20° C. | .00393 |
| Climax | 20° C. | .0007 | Gold | 20° C. | .0034 |
| | | | Iron | 25° C. | .0052 |
| Excello | 20° C. | .00016 | Lead | 20° C. | .0039 |
| | | | Magnesium | 20° C. | .0040 |
| German silver | 20° C. | .0004 | Mercury | 20° C. | .00089 |
| | | | Molybdenum | 25° C. | .0033 |
| Manganin | 25° C. | Zero. | Nickel | 25° C. | .0043 |
| | | | Palladium | 20° C. | .0033 |
| Monel metal | 20° C. | .0020 | Platinum | 20° C. | .003 |
| | | | Silver | 20° C. | .0038 |
| Therlo | 20° C. | .00001 | Tantalum | 20° C. | .0031 |
| | | | Tin | 20° C. | .0042 |
| | | | Tungsten | 18° C. | .0045 |
| | | | Zinc | 20° C. | .0037 |

It will be noted, and is well known among physicists that all pure metals except mercury have an average temperature coefficient of resistance at 20° C. of approximately .004, whereas alloys have an infinite range of coefficients. It is to be understood that when I mention high coefficient materials I refer to materials having a coefficient of .003 to .0052, generally pure elementary metals. When I mention low coefficient materials I refer to materials of less than .003 coefficient, generally alloys of two or more metals. When I state that two high temperature coefficient materials have approximately equal coefficients it is to be understood that any commercially pure elementary metals except mercury are referred to. Thus nickel and copper may be used. the coil design permitting the copper to operate with the usual 30° C. or 50° C. temperature rise while the nickel rises to several hundred degrees centigrade. Due to its higher temperature the nickel will change in resistance to a much greater extent than the copper, even though their temperature coefficients are approximately the same.

Conditions may arise in which it is desirable to have more than two windings. For instance there may be two windings connected so that their magnetic effects assist each other, and a single winding magnetically opposed to the two. For clearness the claims are drawn to two opposed windings. It is to be understood that two or more windings whose magnetic effects are additive are equivalent to a single winding.

Referring to the drawings in detail, reference character 1 designates an alternating current power supply circuit which is electrically connected to any form of load 2 through the appliance of my invention which I have indicated generally at 3. The device of my invention includes inductance 4 and inductance 5 which are wound in magnetic opposition. The inductances 4 and 5 may have different numbers of turns but the same or similar temperature coefficients of resistance. Assume it is desired to produce a device which will, when cold, have a relatively low impedance and permit current to flow to the load 2 with relatively little voltage drop across the coil 3. The windings 4 and 5 in this case are designed so that, when cold, the current split between them will produce zero or nearly zero resultant magnetism. The fact that one winding gets hotter than the other brings about a condition by which the current split between the two changes, the net effective magnetism increases, the inductive drop across the coil increases, and the current to the load decreases.

If, however, it is desired to increase the current to the load after the lapse of a given time interval, the windings 4 and 5 are designed so that the current split between them, when cold, will result in a relatively large amount of magnetism. The initial inductive drop across the coil will be a maximum and a large initial impedance is offered to currents passing to the load. After the lapse of a predetermined time interval, the current split between the windings will be altered in accordance with thermal effects upon the windings, the net effective magnetism will decrease or disappear, the coil's impedance will decrease and thereby increase the current to the load. By varying the design factors which influence the current split between windings 4 and 5, a coil results which has a low impedance when cold, high when hot, or vice versa. The design of the coil, therefore, determines the manner in which current is to be supplied to the load.

The coils can be exactly alike in every way when cold but are arranged so that one gets intensely hot, while the other stays cool, and they will unbalance due to the increased resistance of the hot coil reducing its own ampere turns. It does not matter whether the heat to do this comes from an external source, from the current in the coil, or from heat exchanged between the two.

A tabulation follows in which the ampere turns difference between the opposed windings in passing from the cold to hot condition is illustrated numerically. In each instance, the materials in both windings have the same or similar temperature coefficients of resistance.

to 1 and the currents cold are equal in the two coils. Therefore to get coil 5 heated and not coil 4, external heat would have to be supplied to the former. In column 3 the turns are 2 to 1 and while the cold ampere-turns are the same as in column 1 the current in coil 5 is double that in coil 4 and it will therefore heat itself faster than coil 4. The advantage of difference in turns is therefore that one coil draws little current and stays cool and the other a larger current and gets hot. Column 2 differs from column 1 in that the currents cold are unequal, that is, the cold resistances are proportioned so that coil 5 has a larger current than coil 4. Coil 5, therefore, gets hotter with the result that the ampere turns equalize. This is the reverse of column 1 where they start equal and produce a difference when hot. The coil in column 1 will, therefore, have magnetism when hot, while that in column 2 will have magnetism when cold. The point involved in these examples is that anything which alters the effective ampere turns of the two coils with heat over a time period will produce the slow reactor effect. It is not essential that the materials or the coils as units have different temperature coefficients, nor that the coils have equal or unequal turns. It is essential that the resistance of one or both windings change with time as a result of heating. They may balance cold or balance hot, or they may balance at some midpoint and be unbalanced both cold and hot. These effects may be brought about by heating one coil and simultaneously cooling the other; by heating one and leaving the other cool; by heat transfer between the two; or in any other way of changing the resistance of one or both windings by heat for producing a change in effective ampere turns over a time period.

As illustrated in Fig. 2, inductance 4 may be divided in sections and wound on the laminated core structure 6 in inductive relation to and over the turns of inductance 5 which are wound in the slots 7 of the core structure 6. In this arrangement the turns of coil 5 are laminated in sections between the turns 4. The coil 4 is the coil which is raised to a higher temperature than coil 5.

It is well known that a conductor in air requires less current to heat it to a given temperature than one surrounded by solid material. Coil 4, Fig. 2, will therefore rise to a higher temperature than coil 5 even though the currents in each are equal and the conductors are of the same size and kind of material. In Fig. 4 the core 6 will carry off the heat from coil 5 faster than the heat insulation 9 carries off the heat from coil 4. Coil 4 will therefore rise in temperature more

|  | Column 1 | | Column 2 | | Column 3 | |
|---|---|---|---|---|---|---|
|  | Coil 4 | Coil 5 | Coil 4 | Coil 5 | Coil 4 | Coil 5 |
| Turns | 100 | 100 | 100 | 100 | 200 | 100 |
| Resistance: | | | | | | |
| Cold | 1 ohm | 1 ohm | .6 ohm | .3 ohm | 2 ohm | 1 ohm |
| Hot | 1.5 ohm | 3 ohm | 1 ohm | 1 ohm | 2.5 ohm | 2.5 ohm |
| Current: | | | | | | |
| Cold | 10 amp | 10 amp | 6⅔ amp | 13⅓ amp | 5 amp | 10 amp |
| Hot | 13⅓ amp | 6⅔ amp | 10 amp | 10 amp | 7.5 amp | 7.5 amp |
| Ampere turns: | | | | | | |
| Cold | 1,000 | 1,000 | 666⅔ | 1,333⅓ | 1,000 | 1,000 |
| Hot | 1,333⅓ | 666⅔ | 1,000 | 1,000 | 1,500 | 750 |
| Ampere turn difference: Hot | 666⅔ | | 0 | | 750 | |
| Cold | 0 | | 666⅔ | | 0 | |

The effect of altering the ratio between the number of turns is shown in columns 1 and 3 in the tabulation. In the former the turns are 1 than coil 5 even though both have equal currents and wires of the same size and same material.

In order that the time period over which the effective number of ampere turns in the windings may be controlled, I may employ heat insulation between the coils 4 and 5 as shown in Figs. 4 and 5. In this arrangement the coil winding 5 is wound adjacent the core structure 6 as shown and is covered by the heat insulating support in the form of a casing for the hot coil 4. The turns of hot winding 4 are wound in the heat insulating support 9 and covered by a casing of insulating material 10 for thoroughly protecting the winding 4 from radiation of heat. The time period within which the coils thermally act one upon another may in this way be extended over a substantial period of time and the influence of external temperature changes is rendered negligible.

Various means other than described above may be employed to insure that coil 4, Fig. 2, gets hotter than coil 5. It may be of material which develops a lot of heat with passage of current while 5 may be the reverse. Heated air may be circulated in the duct space adjacent coil 4. Cooling air may be circulated in spaces between the turns of coil 5. (Spaces not shown.) Coil 4 may have an auxiliary heating winding wound in with it or any one of several different means employed to accomplish heating of one winding, cooling of the other, or both.

In Figs. 6 and 7, I have shown opposite conditions which can be brought about by use of the appliance of my invention. In Fig. 6 the amplitude of current supplied to the load after application of potential across the line terminals 1, is illustrated as relatively low due to the high effective impedance of the device 3. This high impedance is produced by having the coils 4 and 5 magnetically unequal when cold, producing a maximum amount of magnetism and establishing a relatively high effective impedance in series with the load. However, after one or both of the windings have changed in temperature the effective number of ampere turns are changed and the effective impedance of the device lowered, enabling an increase in current to the load. The original condition of current supplied to the load as above described, is illustrated by reference character 14 in Fig. 6. The increase in current to the load is indicated by curve 15 and the condition of current thereafter supplied to the load is shown by curve 16. Fig. 7 illustrates the condition on which the windings 4 and 5 originally equalize each other magnetically. The impedance is low on starting as represented by curve 17 but after at least one coil is acted on thermally the relative ampere turns become unbalanced and the current to the load decreases along curve 18 and is thereafter supplied to the load along curve 19. The relationship of the parallel connected windings in inductive opposition is such that the windings which are made of materials having substantially equal positive or negative temperature coefficients of resistance are so disposed that one winding is arranged to dissipate more watts per square inch than the other winding and thereby rise to a higher temperature.

Fig. 8 represents the effect of line current where a coil is initially balanced, becomes unbalanced when partly heated, and balances again when hot.

My investigations have brought out the following conditions which are experienced in the unbalancing and balancing of the coacting coils:

(1) Coil balanced, i. e., ampere turns of both windings equal, no magnetism, no inductive drop through coil, minimum impedance, maximum line current, maximum voltage across load in circuit.

(2) Coil unbalanced, i. e., ampere turns of one winding minimum, other winding maximum, maximum magnetism, maximum inductive drop through coil, maximum impedance, minimum line current, minimum voltage across load in circuit.

The appliance of my invention has numerous applications where control of an electrical circuit is desired without moving parts. Among such applications I refer to the use of the appliance of my invention in connection with the starting circuits of motors; as a regulator of power transformers; as a reactance device; for use as a circuit limiting device in place of a safety fuse; for use in connection with arc welding coils; for service as a loading coil in telephone and telegraph circuits; for use as a voltage regulator in radio sets and power lines; and for use in series lighting circuits as a constant current regulator. A series coil as a fuse substitute or maximum demand controller must not have much resistance drop yet it has to have many turns to produce the inductive voltage. The cold coil is formed from heavy enough copper so that under maximum current the drop is within the allowable limits. No matter how much the hot coil changes the I R drop cannot go up as it is fixed by the low resistance of the cold coil. The appliance of my invention finds particular application in electric metering systems as a maximum demand controller. The appliance of my invention, when connected in motor or generator fields becomes an effective controller thereof. Another application of my invention resides in the control of induction motors at a predetermined time after the application of the alternating current energizing current to the synchronous motor through the device of my invention. By employing the device of my invention the motor can be started after the application of the energizing current.

While I have described my invention in certain of its preferred embodiments, I desire that it be understood that modifications may be made and that no limitations upon my invention are intended other than are imposed by the scope of the appended claims.

What I claim as new and desire to secure by Letters Patent of the United States is as follows:

1. Means for automatically altering the current voltage or power factor of an electrical system which includes a supply source and a load, comprising a reactor in series with the load, said reactor being constituted by two windings connected in parallel and in effective inductive opposition, said windings being formed of materials having substantially equal positive or negative temperature coefficients of resistance, and means for causing one winding to heat or cool more than the other winding.

2. In an electric system, a supply circuit, a load circuit and a reactor in series with the load, said reactor being constituted by two windings connected in parallel and in effective inductive oppositon, said windings being formed of materials having substantially equal positive or negative temperature coefficients of resistance, the windings being arranged to be heated unequally by the current flow therein.

3. In an electric system, a supply circuit, a load circuit and a reactor in series with the load, said reactor being constituted by two windings connected in parallel and in effective inductive opposition, said windings being formed of materials having substantially equal positive or negative temperature coefficients of resistance, one winding being arranged to generate more watts per square inch of radiating surface than the other and heat dissipating means proportioned to permit the winding generating more watts per square inch to rise to a higher temperature.

4. In an electric system, a supply circuit, a load circuit and a reactor in series with the load, said reactor being constituted by two windings connected in parallel and in effective inductive opposition, said windings being formed of materials having substantially equal positive or negative temperature coefficients of resistance, one winding having more turns than the other, the currents in the windings being approximately in the inverse ratio of the turns when balanced magnetically, the windings being proportioned as to heat generation and dissipation to permit the winding of smaller number of turns to rise to a higher temperature than the other.

5. In an electric system, a supply circuit, a load circuit and a reactor in series with the load, said reactor being constituted by two windings connected in parallel and in effective inductive opposition, said windings being formed of materials having substantially equal positive or negative coefficients of resistance, means for producing a disproportionate temperature change in the windings and heat insulation or air spaces between the windings.

6. A reactor constituted by two windings connected in parallel and in inductive opposition wound on a core of magnetic material, said windings being formed of materials having substantially equal positive or negative temperature coefficients of resistance, and means for disproportionately changing the resistance of the two windings under load to alter the inductive voltage drop across the reactor.

7. In an electric system, a supply circuit, a load circuit and a reactor in series with the load, said reactor being constituted by two windings connected in parallel and in effective inductive opposition, said windings being formed of materials having substantially equal positive or negative temperature coefficients of resistance, means for producing a disproportionate temperature change in the windings to alter the ratio of the currents in the parallel paths and vary the resultant magnetism in the reactor for changing its inductive reactance and thereby controlling the current passing to the load.

8. In an electric system, a supply circuit, a load circuit and a reactor in series with the load, said reactor being constituted by two windings connected in parallel and in effective inductive opposition, said windings being formed of materials having substantially equal positive or negative temperature coefficients of resistance, means for producing a disproportionate temperature change in the windings to alter the ratio of the current in the parallel paths and vary the resultant magnetism in the reactor for changing the power factor of the circuit.

9. A reactor as set forth in claim 7 in which said windings operate at substantially unity power factor when cool and less than unity power factor when heated.

10. A reactor as set forth in claim 7 in which said windings operate at unity power factor when heated and less than unity power factor when cool.

11. A reactor as set forth in claim 7 in which said windings operate at unity power factor at a selected temperature and less than unity power factor at other temperatures.

12. A reactor comprising a pair of magnetically coupled and inductively opposed windings arranged on a core of magnetic material and disposed in parallel, said windings being formed of metals having the same or approximately equal temperature coefficients of resistance other than zero, and means for causing one winding to operate at a temperature of 50° C. or below, and the other winding to rise above a temperature of 50° C.

13. A reactor as set forth in claim 12 wherein the high temperature of the hottest winding is produced by the current flowing in that winding.

14. A reactor as set forth in claim 12 in which the high temperature of the hottest winding is partially effected by the application of heat from an external source.

15. A reactor as set forth in claim 12 in which the high temperature of one of said windings is produced partially by heat supplied by the other of said windings.

16. A reactor as in claim 12, the high temperature winding being formed of nickel and the low temperature winding being formed of copper, the copper winding of greater turns than the nickel.

17. A reactor made up of two windings connected in parallel and in effective inductive opposition, said winding being formed of materials having substantially equal positive or negative temperature coefficients of resistance, and artificial cooling means for one winding only.

18. As an article of manufacture, a reactor comprising a core of magnetic material, two windings connected in parallel, inductively coupled and opposed and arranged on the core so that any magnetism in the core linking with one winding links with the other, said windings being formed of materials having the same or substantially equal temperature coefficients of resistance other than zero, means for causing a disproportionate rise in temperature of the windings, heat insulation between the high and low temperature windings and between the high temperature winding and the core.

19. A reactor as in claim 18 wherein one winding is surrounded by material of lower heat conductivity than the other.

20. In an electric system, a supply circuit, a load circuit and a reactor in series with the load, said reactor being constituted by two windings connected in parallel and in effective inductive opposition, said windings being formed of elementary solid metals having positive temperature coefficients of resistance of approximately .003 to .0052 per ° C., and means for causing the winding employing the higher coefficient metal to rise to a higher temperature than the other.

21. A reactor comprising two magnetically coupled and inductively opposed windings connected in parallel, said windings being formed of elementary solid metals having positive temperature coefficients of resistance of approximately .003 to .0052 per ° C., and means for causing the winding employing the higher temperature coefficient metal to operate at a temperature above 50° C. and the other at 50° C. or below.

22. A reactor comprising two magnetically coupled and inductively opposed windings connected in parallel, said windings being formed of elementary solid metals having positive temperature coefficients of resistance of approximately .003 to .0052 per ° C., heating means to cause the winding employing the higher coefficient metal to rise to an elevated temperature, and cooling means to cause the other winding to fall to a lower temperature.

23. A reactor comprising two magnetically coupled windings connected in parallel and in effective inductive opposition, the two windings being formed from the same material, and means for causing one winding to rise to a higher temperature than the other.

ALBERT B. RYPINSKI.